Nov. 3, 1959 E. H. AYERS ET AL 2,911,053
ELECTRIC TRUCK CONTROL
Filed May 16, 1956 12 Sheets-Sheet 1

INVENTORS.
EDGAR H. AYERS
GEORGE J. BERRY
GEORGE J. TRUSOCK
BY
ATTYS.

Nov. 3, 1959 E. H. AYERS ET AL 2,911,053
ELECTRIC TRUCK CONTROL
Filed May 16, 1956 12 Sheets-Sheet 3

INVENTORS.
EDGAR H. AYERS
GEORGE J. BERRY
GEORGE J. TRUSOCK
BY
*Brown, Jackson, Boettcher & Dienner*
ATTYS.

Nov. 3, 1959　　　E. H. AYERS ET AL　　　2,911,053
ELECTRIC TRUCK CONTROL
Filed May 16, 1956　　　　　　　　　　　　　　12 Sheets-Sheet 8

INVENTORS.
EDGAR H. AYERS
GEORGE J. BERRY
GEORGE J. TRUSOCK
BY
Brown, Jackson, Boettcher & Dienner,
ATTYS.

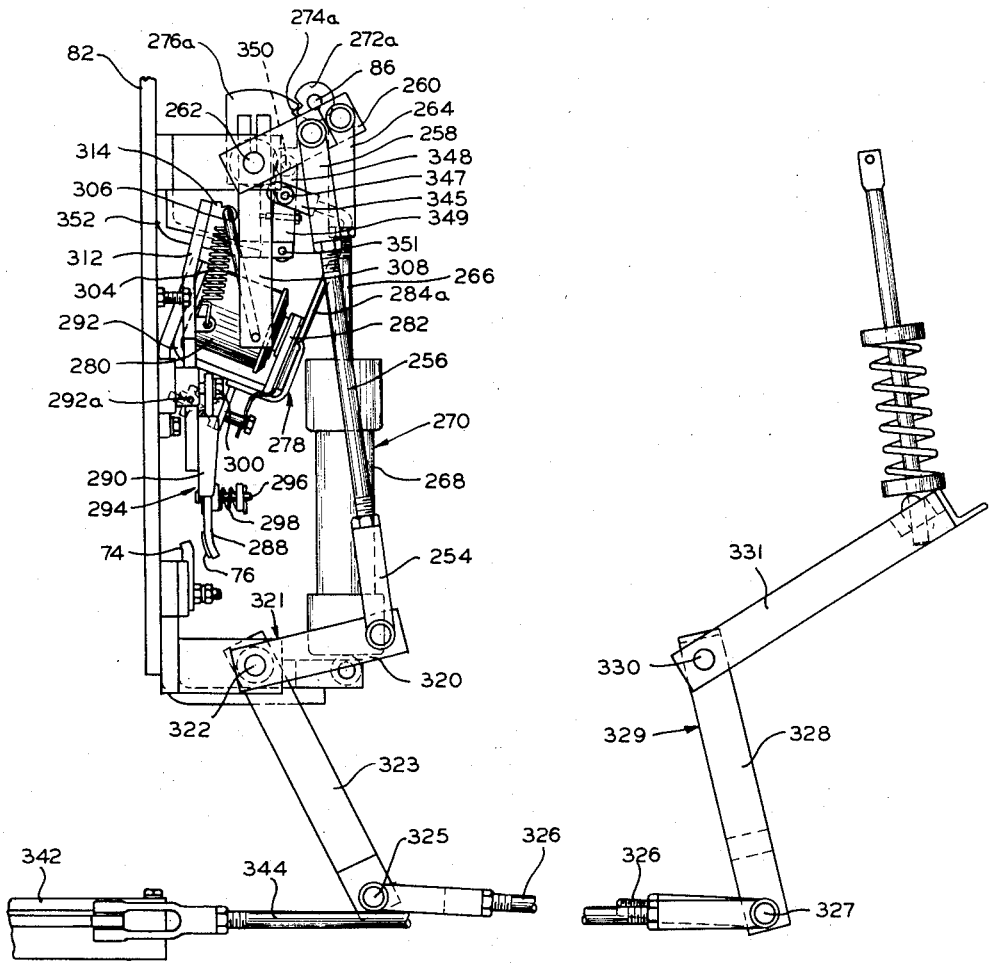

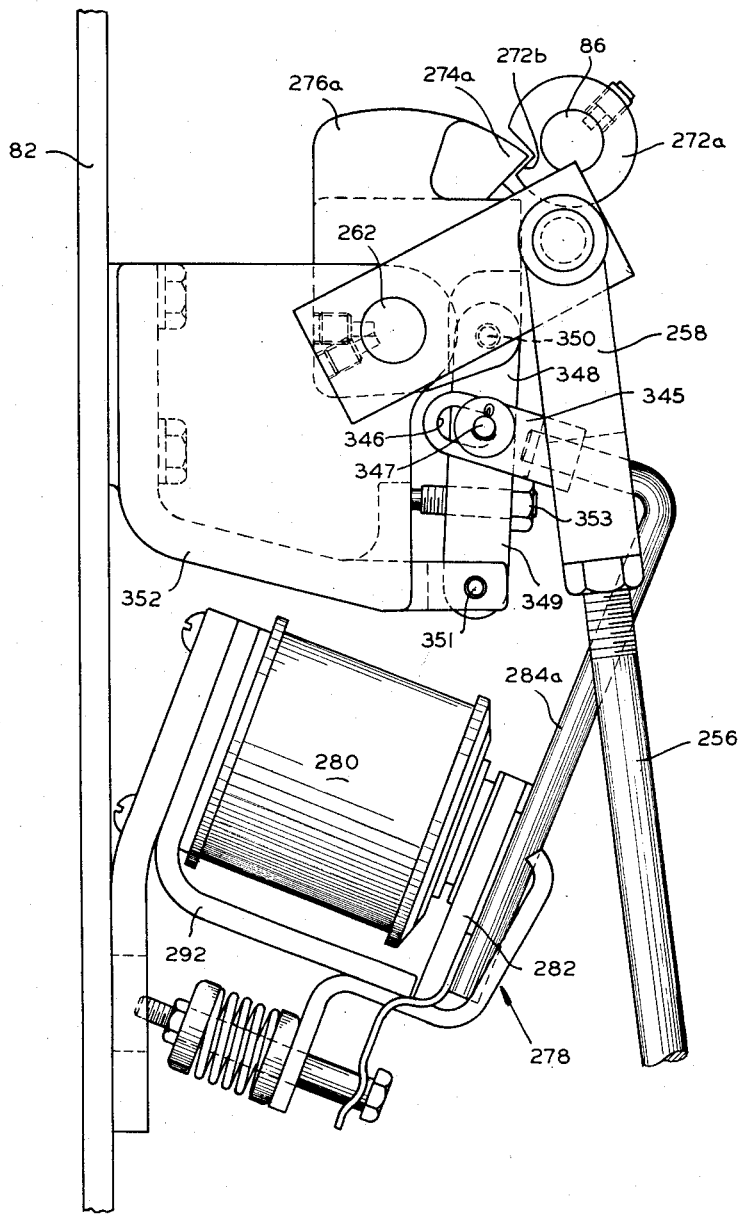

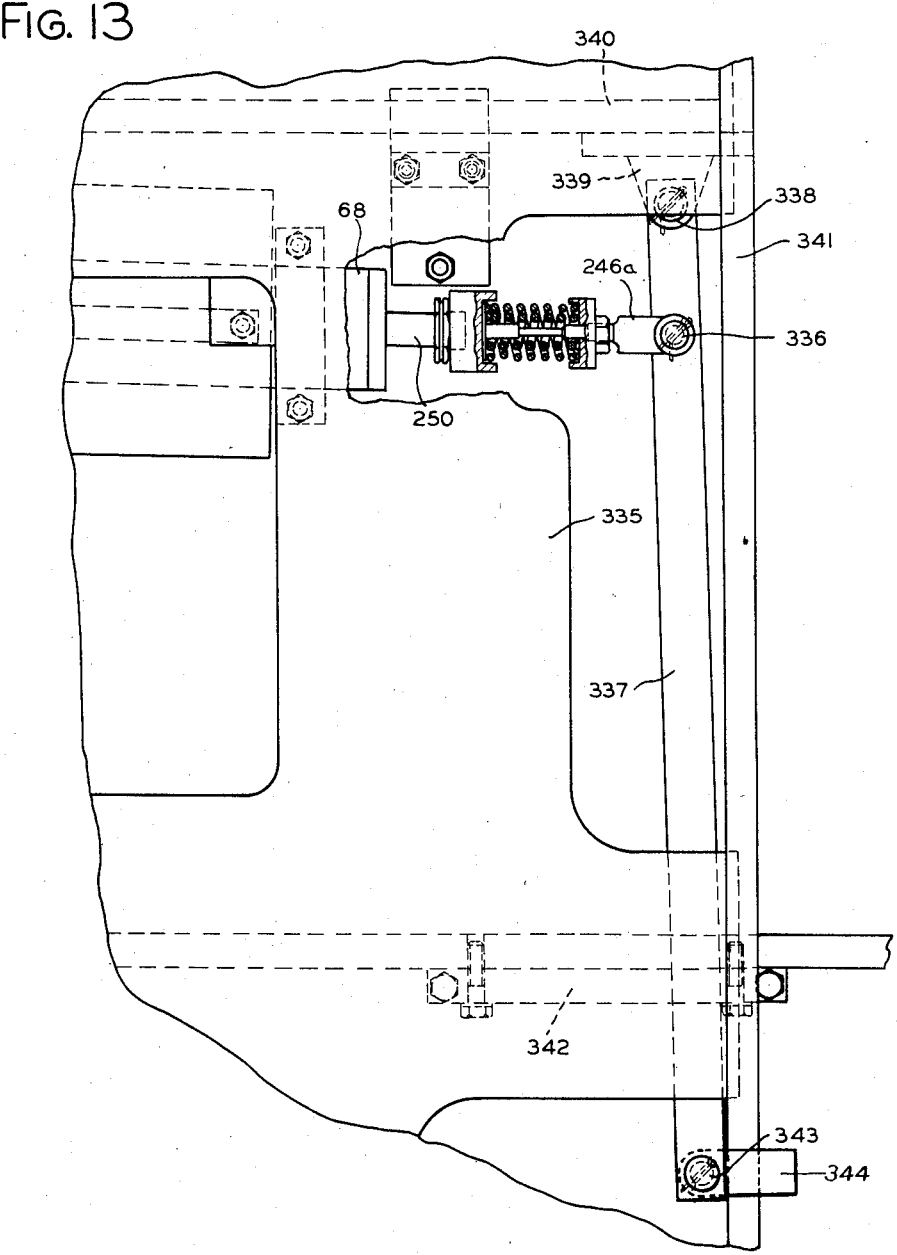

Nov. 3, 1959

E. H. AYERS ET AL 2,911,053

ELECTRIC TRUCK CONTROL

Filed May 16, 1956

INVENTORS.
EDGAR H. AYERS
GEORGE J. BERRY
GEORGE J. TRUSOCK
BY
ATTY.

United States Patent Office 2,911,053
Patented Nov. 3, 1959

2,911,053

ELECTRIC TRUCK CONTROL

Edgar H. Ayers, Niles, and George J. Berry and George J. Trusock, Battle Creek, Mich., assignors to Clark Equipment Company, a corporation of Michigan Application May 16, 1956, Serial No. 585,336

15 Claims. (Cl. 180—82)

Our present invention relates to control means for the electric drive motor of a vehicle such as an industrial fork lift truck.

It is an object of our present invention to provide control means whereby the speed of the electric drive motor of a vehicle may be uniformly accelerated and decelerated so as to prevent jolting of the vehicle and loads carried thereby.

To accomplish the above object, we incorporate a carbon pile regulator or rheostat in the circuit of the electric drive motor. The regulator comprises a plurality of adjacent movable carbon elements. As the pressure on the carbon elements is changed, the unit resistance offered by the regulator decreases evenly, thus providing for stepless speed control of the electric motor. Pressure applied to the carbon elements is controlled by linkage means which is actuated by foot operated acceleration control means. To provide for uniform acceleration and deceleration, time delay means is associated with the acceleration control linkage means for limiting the speed with which the latter may be actuated.

As a feature of our present invention, maximum speed of the drive motor is attained by shorting out the regulator after the carbon elements of the latter have been compressed to a minimum-resistance position. Shorting out of the regulator is accomplished by switch means which is operated by the acceleration control linkage means.

As another feature of our invention, we include, in the acceleration control linkage means, means for always maintaining at least a minimum pressure on the carbon elements of the regulator so as to prevent arcing and mechanical abrasion between the elements.

It is another object of our present invention to provide control means which permits operation of the electric drive motor only when an operator is seated on the vehicle operator's seat.

We interpose in the circuit of the electric drive motor a directional switch which may include, by way of example, an actuator pivotal to a neutral, forward or reverse drive position for controlling the direction of drive of the electric motor. Preferably, manually operable linkage means yieldably engages the one end of the switch actuator and is operable to pivot the latter from a neutral to a forward or reverse drive position. Linkage means is operatively associated with the operator's seat of the vehicle and the switch actuator linkage means for preventing movement of the switch actuator from a neutral position when an operator is not on the seat, and for returning the switch actuator to a neutral position when the vehicle operator's weight is removed from the seat. This arrangement serves as safety means for the truck, preventing unattended operation of the latter.

It is a further object of our invention to provide control means which permits the vehicle in be "inched" (moved in slight increments) forwardly or rearwardly to facilitate accurate positioning of the vehicle, as, for example, when a load is being engaged or deposited, and permits applying power to the drive motor without the necessity of an operator moving his foot to the speed control thereby reducing the amount of truck roll back when starting on grades.

This object may be accomplished by providing linkage means controlled by the vehicle brake actuating means and engageable with the other end of the directional switch actuator for pivoting the latter to a neutral position when the vehicle brakes are applied. The switch actuator is returned to a neutral position without changing the position of the switch actuator linkage means so that when the vehicle brakes are released the switch actuator linkage means is available immediately to pivot the switch actuator back to the manually preselected forward or reverse drive position. By interrelating the switch actuator with the vehicle brakes, the operator of the vehicle may stop the drive motor when braking the vehicle to a stop, which is desirable.

Another object of our invention is to provide control means which prevents both initial energization of the electric motor and subsequent reversals in the direction of current flow to the latter when the electric motor circuit is conditioned for a high rate of current flow.

This object is accomplished by providing interlock means between the acceleration control linkage means and the switch actuator linkage means for preventing movement of the latter when the acceleration control linkage means is holding the regulator in any position other than a maximum resistance (minimum current flow) position.

Now in order to acquaint those skilled in the art with the manner of constructing and using control means in accordance with the principles of our present invention, first we shall describe, in connection with the accompanying drawings, a preferred embodiment of our invention.

In the drawings:

Figure 12 is a side view of the means for cutting out of the motor circuit the carbon pile regulator and of a modified form of means for limiting surges of current to the drive motor;

Figure 12A is an enlarged inside elevation showing a portion of the mechanism seen in Figure 12 to demonstrate details of construction;

Figure 13 is a fragmentary semi-diagrammatic underneath view of the truck showing a further modification in which the carbon pile regulator is mounted beneath the truck.

Figure 1:
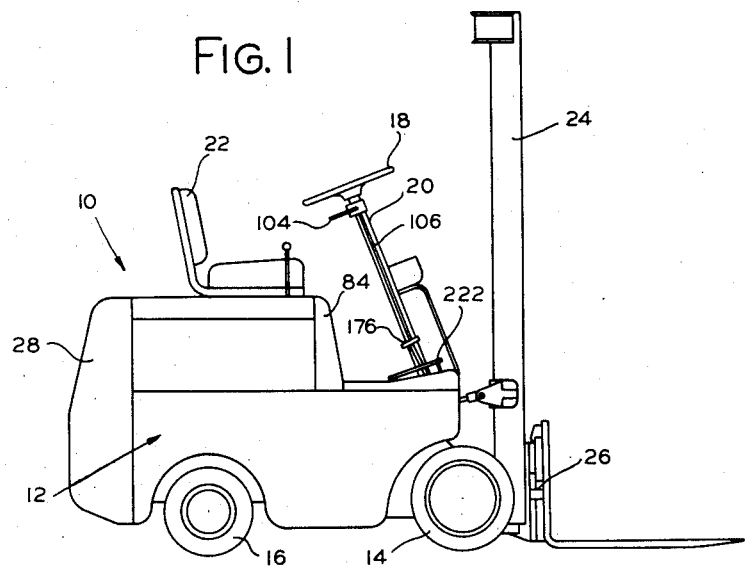
Figure 1 is a side elevational view of an industrial fork lift truck with which the control means of our present invention is embodied.

Although the control system of our present invention is adaptable for use with commercial vehicles of various types, by way of exemplification and not limitation, we shall describe our invention as it may be embodied in an industrial fork lift truck such as is shown at 10 in Figure 1. The vehicle 10 comprises a main frame 12 that is supported at its forward end on drive wheels 14 and at its rear end on steering wheels 16. The steering wheels 16 are controlled by a hand steering wheel 18 arranged at the upper end of a steering column 20 located adjacent an operator's seat 22. Supported at the forward end of the truck frame 12 is a generally vertically extending tiltable mast or upright assembly 24, in which a load supporting carriage assembly 26 is upwardly and downwardly movable, and supported at the rear end of the truck frame 12 is a counterweight 28. The truck 10 is powered by an electric motor 30 which is operatively connected to the front drive wheels 14 through suitable torque transmitting means (not shown).

Figure 2:
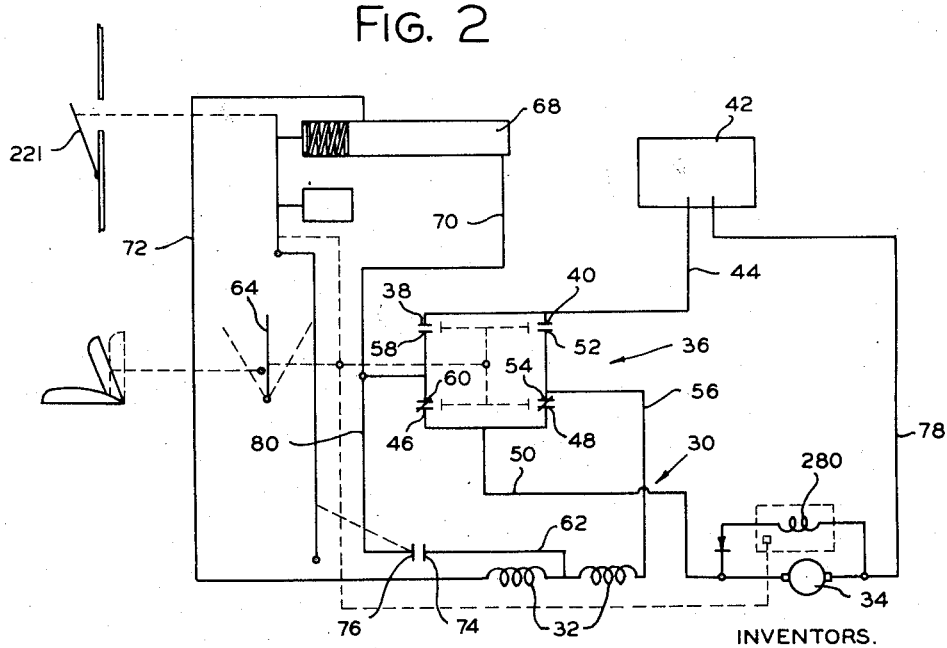
Figure 2 is a diagrammatical view of a preferred control means of our present invention.
Figure 3:
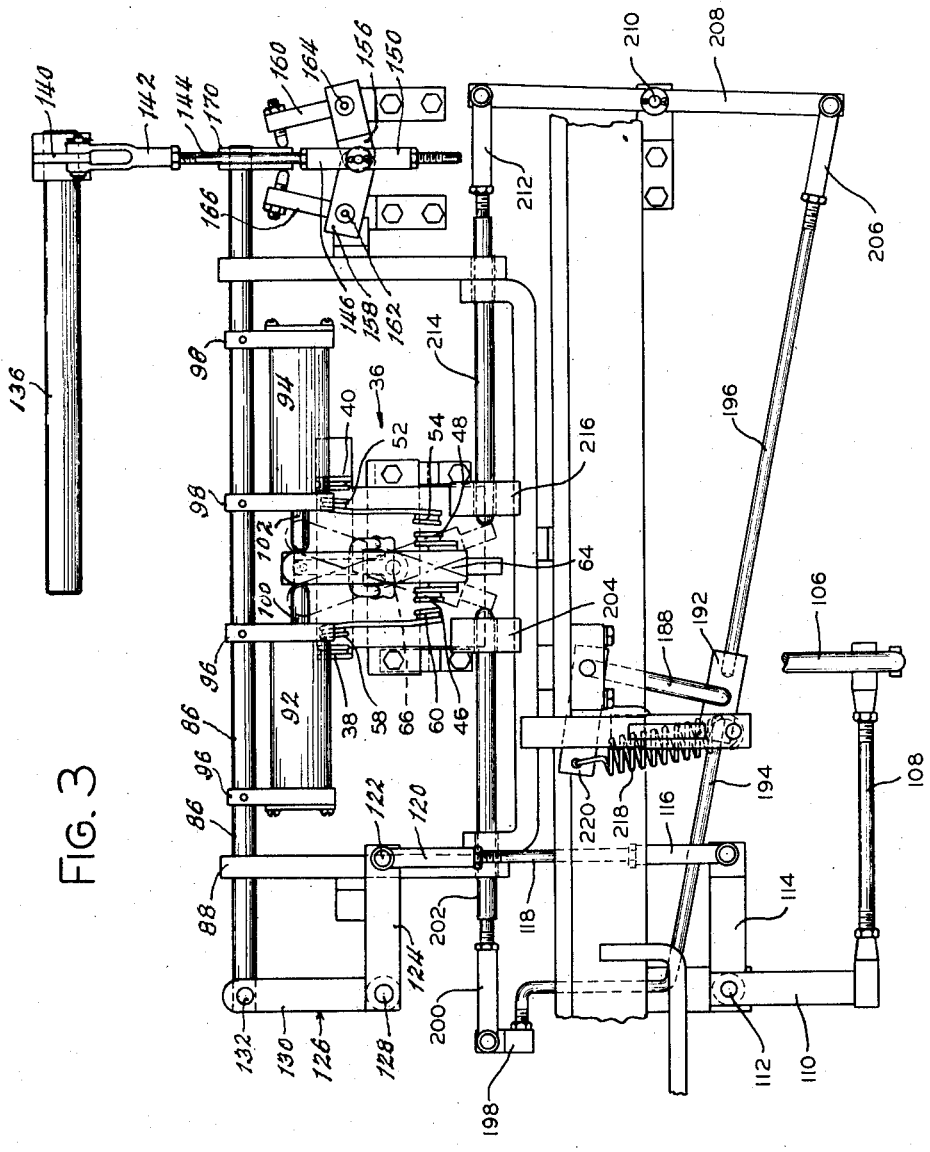
Figure 3 is a front elevational view of a portion of the directional control linkage of the control means of our present invention.

The motor 30, together with the electrical circuit therefor, is shown diagrammatically in Figure 2, and comprises field windings 32 and an armature 34. We shall first describe the electrical components of the drive motor circuit and then we shall describe the control means for operating these components. The direction of drive of the motor is controlled by a directional switch unit, indicated generally by the reference numeral 36. The switch unit 36 comprises a pair of contacts 38 and 40 that are connected to a battery 42 through a conductor 44, a pair of contacts 46 and 48 that are connected to one side of the armature 34 through a conductor 50, a pair of contacts 52 and 54 that are connected to one side of the field windings 32 through a conductor 56, and a pair of contacts 58 and 60 that are connected to the center point of the field windings 32 by means to be described presently. The switch contacts are physically arranged as shown in Figure 3 and are adapted to be operated by means of an actuator 64 pivotally mounted, intermediate of its ends, about a horizontal axis 66. The motor circuit further includes a carbon pile regulator or rheostat 68, comprised of a plurality of adjacent movable carbon elements, one side of which is connected to contacts 58 and 60 through a conductor 70 and the other side of which is connected to the other side of the motor field windings 32 through a conductor 72.

Direction of drive of the motor 30 is selected by causing the actuator 64 to rotate either clockwise or counterclockwise from the vertical neutral position shown in Figure 3. Such movement of the actuator 64 causes one of the diagonal pairs of switch contacts to close.

The motor 30 (and correspondingly the vehicle 10) is driven in a forward direction if the contacts 40 and 46 are respectively engaged with the contacts 52 and 60. Current flows from the battery 42 through conductor 44, contacts 40 and 52, conductor 56, motor field windings 32, conductor 72, regulator 68, conductor 70, contacts 46 and 60, conductor 50, motor armature 34 and conductor 78 back to the battery 42. On the other hand, the motor 30 is driven in a reverse direction if the contacts 38 and 48 are respectively engaged with the contacts 58 and 54. For reverse drive, current flows from the battery 42 through conductor 44, contacts 38 and 58, conductor 70, regulator 68, conductor 72, field windings 32, conductor 56, contacts 48 and 54, conductor 50, armature 34 and conductor 78 back to the battery 42. From the foregoing, it will be apparent that the switch actuator 64 may be pivoted from a neutral position to either a forward or a reverse drive position.

Speed of the motor 30 is controlled, in both forward and reverse drive, by changing the pressure applied to the carbon elements of the regulator 68 for varying the resistance offered by the latter to the flow of current in the motor circuit. The carbon pile regulator 68 provides for infinite variation in speed control. The truck may be "inched" into position in the manner previously described, or by alternately increasing and decreasing the extent of compression of the carbon elements of the regulator 68, as will be understood from the above. Associated with the regulator 68 is switch means comprising a pair of normally open contacts 74 and 76 respectively connected by conductors 62 and 80 to the center point of field windings 32 and to the conductor 70. When the carbon elements of the regulator 68 are compressed to predetermined extent the contacts 74 and 76 may be engaged for cutting the regulator 68 and the low speed motor winding 32 out of the electrical circuit. The carbon pile regulator 68 and the directional switch unit 36 are preferably mounted on a transverse vertical plate 82 (Figure 4) behind the cover or shield member 84 of the truck shown in Figure 1.

Figure 4:
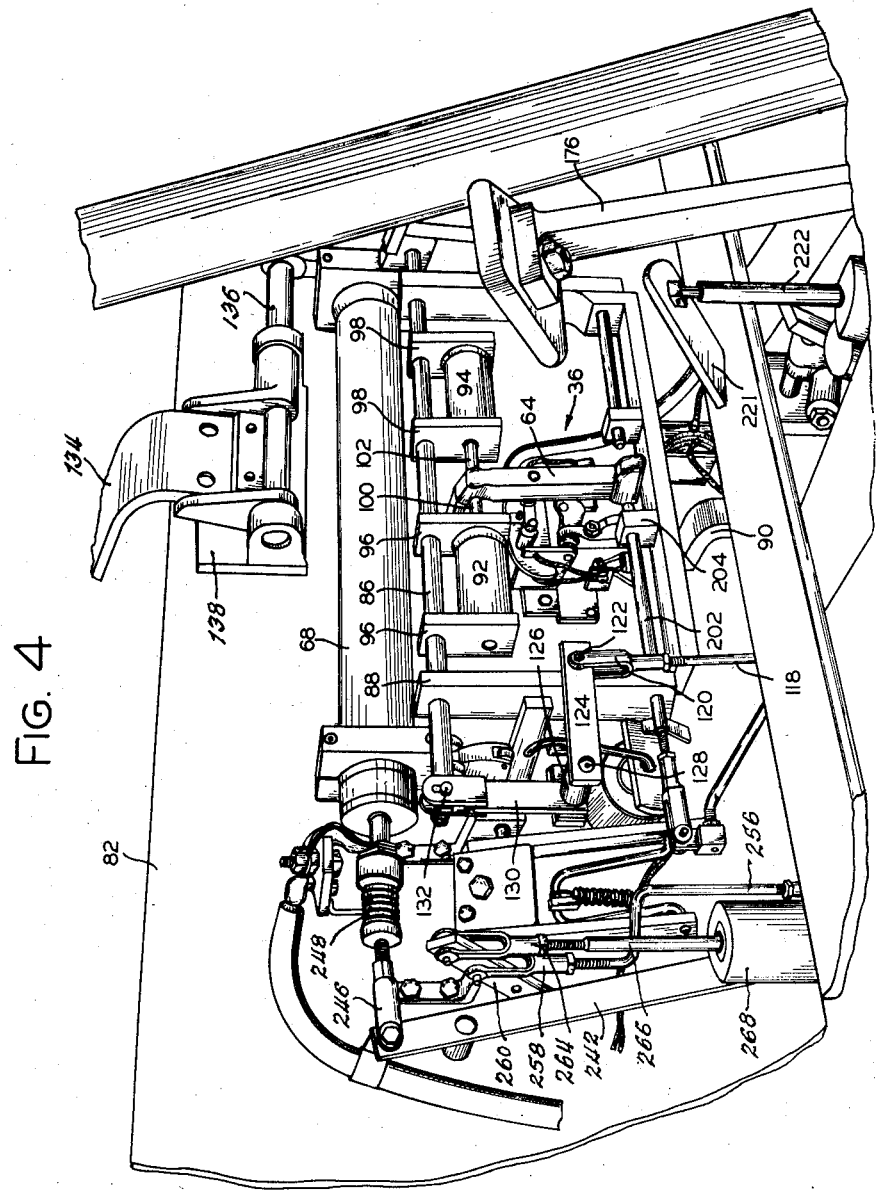
Figure 4 is a perspective view of a portion of the speed and directional control linkage of our control means.

The description of the electric components of the drive motor circuit having been completed, we shall now describe the construction and operation of the control means therefor. The directional switch actuator 64 is adapted to be pivoted from a neutral to a forward or reverse drive position by what we broadly term manually operable linkage means yieldably engaging the upper end of the actuator as shown in Figure 4. Such linkage means comprises a transverse shaft 86 which is slidably journaled in the upper ends of a U-shaped frame 88 secured to plate 82 by a strap member. A pair of aligned horizontal cylinders 92 and 94 are suspended from the shaft 86, at either side of the switch actuator 64, by pairs of vertical members 96 and 98. Horizontal spring-biased plungers 100 and 102 extend respectively out of the facing ends of the cylinders 92 and 94 and terminate at the sides of the upper end of the switch actuator 64. The actuator 64 is pivoted clockwise when the plunger 100 is forced against the left side of the actuator as the shaft 86 is moved rectilinearly to the right from the position shown in Figure 4. Counterclockwise pivoting of the actuator 64 is effected by moving the shaft 86 rectilinearly to the left and forcing the plunger 102 against the right side of the actuator.

Rectilinear movement of the shaft 86 in either direction is adapted to be controlled by a manually operable selector lever 104 supported on the steering column 20 immediately below the hand steering wheel 18. The selector lever 104 is operatively connected with the shaft 86 by further elements of the switch actuator linkage comprising a rod 106 extending parallel to, and supported by, the vehicle steering column 20. The selector lever 104 which is secured to the upper end of the rod 106 at right angles thereto, is adapted to be pivoted by the operator of the truck for causing limited rotary movement of the rod 106. The lower end of the rod 106 has a ball and socket connection with a horizontal rod 108 (Figures 3 and 4) that is secured to a generally vertical crank arm 110 carried at one end of a horizontal rod 112, journaled in bearings supported by the vehicle frame. The other end of the rod 112 supports a generally horizontal crank arm 114 which, at its outer end, is pivotally connected to an upwardly extending clevis member 116 adjustably mounted on the lower end of a generally vertical shank 118. The upper end of the shank 118 adjustably supports a clevis member 120 which has a pin and slot connection 122 with the generally horizontal arm 124 of a bell crank 126 pivotally mounted on a fixed horizontal axis 128. The generally vertical arm 130 of the bell crank 126 lies in a plane offset from the plane of the arm 124 and the clevis member at the upper end of the arm 130 has a pin and slot connection 132 with the left end of the shaft 86.

Pivoting of the selector lever 104 causes limited rotary movement of the rod 106; rectilinear movement of the rod 108; pivotal movement of the crank arm 110, the rod 112 and the crank arm 114; vertical movement of the shank 118 and clevises 116 and 120; pivotal movement of the bell crank 126 and finally rectilinear movement of the shaft 86 for pivoting the actuator 64. The direction in which the selector lever 104 is pivoted determines the direction in which the actuator 64 is pivoted; hence, the selector lever 104 controls the closing of either the forward or reverse drive switch contacts. So as to prevent unauthorized personnel from operating the vehicle, suitable lock means may be provided at the selector lever 104 for locking the lever in a neutral position.

As a safety measure to insure only attended operation of the vehicle, we provide means for preventing rectilinear movement of the shaft 86 (and pivoting of the switch actuator 64) from a neutral position when an operator is not seated on the driver's seat 22. This same safety means also serves to return the shaft 86 (and the switch actuator 64) to a neutral position for interrupting drive of the motor 30 when an operator leaves the seat 22.

Figure 5:
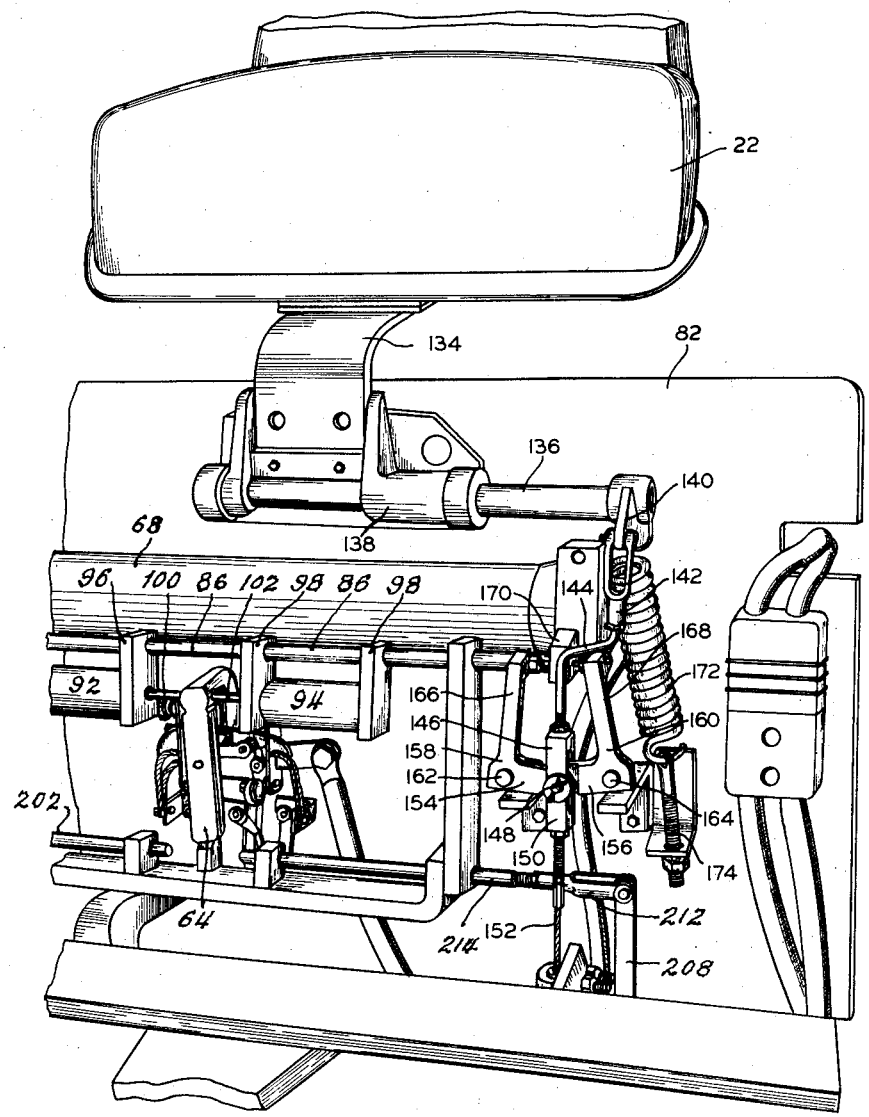
Figure 5 is a perspective view of the vehicle seat actuated linkage means of our control means.

The vehicle operator's seat 22, which serves to operate the safety means, is secured, as shown in Figure 5, by means of a curved strap member 134 to a horizontal shaft 136 that is journaled in a supporting member 138 mounted on the vehicle plate 82. The right end of the shaft 136 carries a crank arm 140 which is pivotally connected at its outer end to a clevis member 142 adjustably mounted on the upper end of a downwardly extending serpentine rod 144. The lower end of the rod 144 adjustably supports a clevis member 146 which is pivotally connected about a pin 148 to a complementary clevis member 150 steadied by a downwardly extending cable assembly 152.

The pin 148, which interconnects the clevises 146 and 150, is received in slots formed in the overlapping generally horizontal arms 154 and 156 of bell cranks 158 and 160 pivotally mounted respectively on fixed horizontal pivots 162 and 164. The generally vertical arms 166 and 168 of the bell cranks 158 and 160 carry, at their uppermost ends, generally horizontal adjustable bolts that are adapted to cooperate with a plate 170 secured to the right end of the switch actuator shaft 86.

When the seat 22 is in the position shown in Figure 5 (a position corresponding to no load on the seat) the bolts at the upper ends of the bell crank arms 166 and 168 engage and center the plate 170. With the plate 170 centered, the switch actuator shaft 86 is held in a neutral position for preventing pivoting of the switch actuator 64 and energization of the drive motor 30. To thereafter free the shaft 86 for rectilinear movement, the seat 22 need only be depressed for pivoting the shaft 136 and crank arm 140 so as to cause upward movement of the rod 144. Upward movement of the rod 144 effects counterclockwise and clockwise movement of the bell cranks 158 and 160, respectively, for swinging the upper ends of the bell crank arms 166 and 168 away from the plate 170. At this point the plate 170 is freed to permit actuation of the switch actuator shaft 86.

When the seat 22 is again released, the serpentine rod 144 is urged downwardly and the bell cranks 158 and 160 are pivoted respectively clockwise and counterclockwise. As a consequence, the upper ends of the bell crank arms 166 and 168 are swung toward each other and the plate 170 is centered therebetween. This centering of the plate 170 returns the shaft 86 (and the switch actuator 64) from a forward or reverse drive position to a neutral position for cutting off current flow to the drive motor 30. To maintain the seat 22, and the safety linkage connected thereto, in the position shown in Figure 5 when an operator is not on the seat, a spring 172 at one end is connected to the crank arm 140 and at the other end is adjustably anchored by an assembly 174 to the vehicle plate 82.

It is desirable that the drive motor 30 be de-energized and stopped when the brakes of the vehicle are applied and we provide appropriate means for accomplishing that result. Considering now Figures 3 and 6, it will be seen that the foot brake lever 176 of the vehicle, which when depressed applies the vehicle brakes, is pivotally mounted about a horizontal axis 178. Engaging the upper edge of the brake lever 176 is the one end of a follower arm 180 that is pivotally mounted to the vehicle frame about a horizontal axis 182. The end of the follower arm 180 that contacts the brake lever 176 pivotally supports the lower end of a rod 184 which extends upwardly and pivotally connects with a crank arm 186 secured to the one end of a shaft 188. The shaft 188 has a horizontal portion that is journaled for limited rotary movement in a bracket 190 secured to the vehicle frame, and a vertical portion that extends downwardly and hooks into a connector 192.

A pair of rods 194 and 196 extend in opposite directions from the connector 192. The left end of rod 194, as viewed in Figure 3, is bent upwardly and is provided with a short horizontal end portion that is fixed in a vertical block member 198 pivotally mounted to a horizontal clevis member 200. The clevis member 200 is carried at the left end of a horizontal actuating rod 202 which is slidably journaled in the left side member of the aforedescribed U-shaped frame 88 and also in a journal block 204 secured to the frame 88. The right end of the rod 196 carries a clevis member 206 which is pivotally connected to the lower end of a generally vertical lever 208 that is pivotally mounted intermediate of its ends about a fixed horizontal axis 210. The upper end of the lever 208 is pivotally connected to a clevis member 212 carried at the right end of a horizontal actuating rod 214 which is slidably journaled in the right side member of the U-shaped frame 88 and also in a journal block 216 secured to the frame 88. The ends of the rods 202 and 214 terminate at the sides of the lower end of the switch actuator 64.

Figure 6:
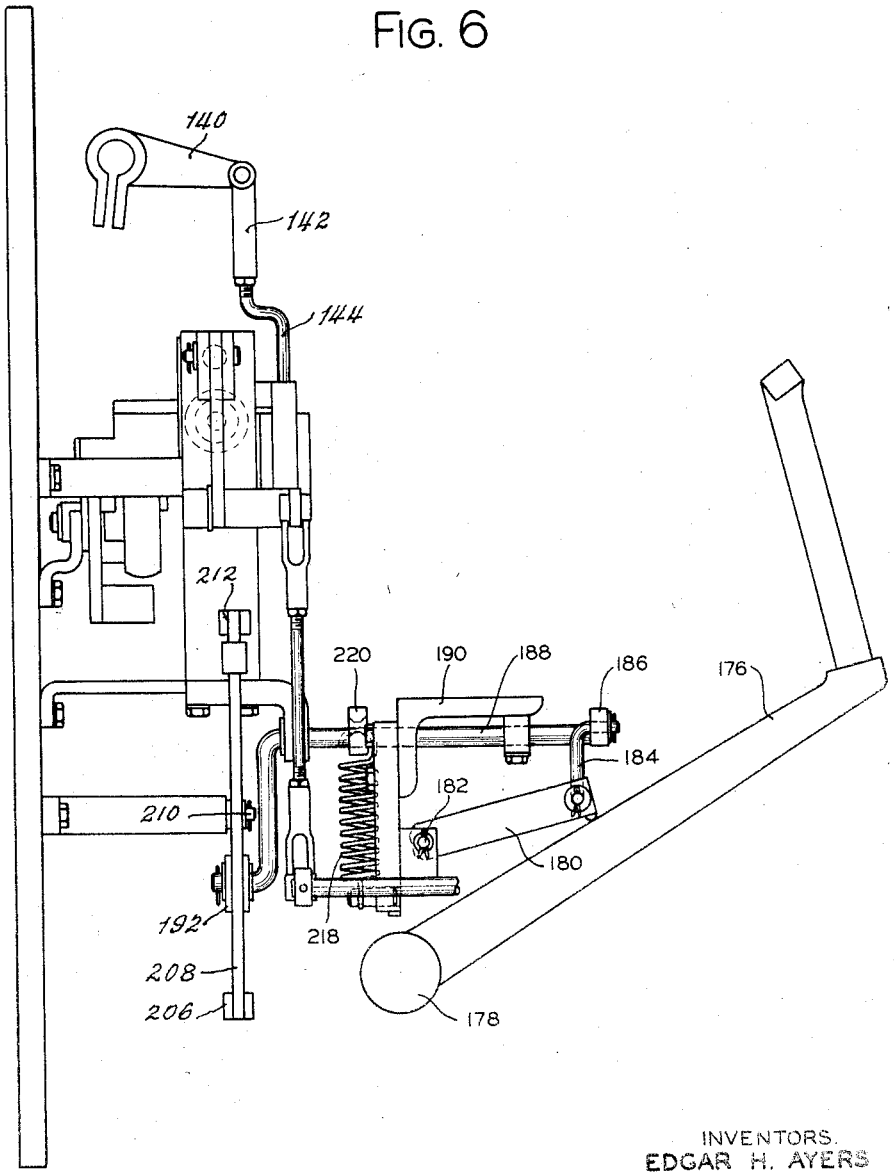
Figure 6 is a side elevational view of the linkage shown in Figure 3.

When the brake lever 176 is in an inoperative or brake releasing position the above described switch actuating linkage assumes the position shown in Figures 3 and 6. Now, when the brake lever 176 is depressed and pivoted clockwise from the position shown in Figure 6, the follower arm 180 is caused to pivot clockwise to the extent permitted by the brake lever 176, under the force of a spring 218 which is connected at its lower end to the vehicle frame and at its upper end to the end of a lever 220 secured to the shaft 188. The spring 218 imposes a counterclockwise force on both the lever 220 and the shaft 188. This force not only acts on the lever 186 and the rod 184 for maintaining the follower 180 in engagement with the brake lever 176 during downward movement of the latter, but also causes the connector 192 and rods 194 and 196 to move to the right, as viewed in Figure 3, when the brake lever 176 is depressed. Movement of the rod 194 to the right causes movement of the actuating rod 202 to the right, while movement of the rod 196 to the right causes counterclockwise rotation of the lever 208 and movement of the actuating rod 214 to the left.

As the actuating rods 202 and 214 are moved toward each other, when the vehicle brakes are applied, they serve to center the switch actuator 64 in a neutral position for de-energizing the drive motor 30. During pivoting of the switch actuator 64 back to a neutral position, the particular spring-biased plunger 100 or 102, toward which the upper end of the actuator 64 is pivoted, moves inwardly of its associated cylinder for permitting pivoting of the actuator 64 while the manually operable switch actuator linkage means remains stationary in the preselected forward or reverse drive position. With this arrangement, the depressed spring-biased plunger 100 or 102 is available to return the actuator 64 to the manually preselected forward or reverse drive position for energizing the motor immediately upon release of the brakes and movement of the rods 202 and 214 away from the switch actuator 64.

From the foregoing, it is to be noted that, on the one hand, the vehicle may be stopped quickly in a short distance upon application of the vehicle brakes, since, in view of the de-energization of the drive motor, the brakes have to arrest only the momentum of the vehicle, while, on the other hand, motion of the vehicle may be quickly initiated, after release of the brakes, since the manually operable linkage means is in a preselected drive position and the appropriate plunger 100 or 102 is available to snap pivot the switch actuator 64 to a drive position. By taking advantage of these expedients the vehicle may be driven quickly, either forwardly or rearwardly, in a series of small increments. The control means of our present invention thus permits the operator of the vehicle, through suitable intermittent manipulation of the vehicle brakes, to "inch" the vehicle forwardly or rearwardly to facilitate quick and accurate positioning of the vehicle as is necessary, for example, when a load is being engaged or deposited in a confined area.

Figure 7:
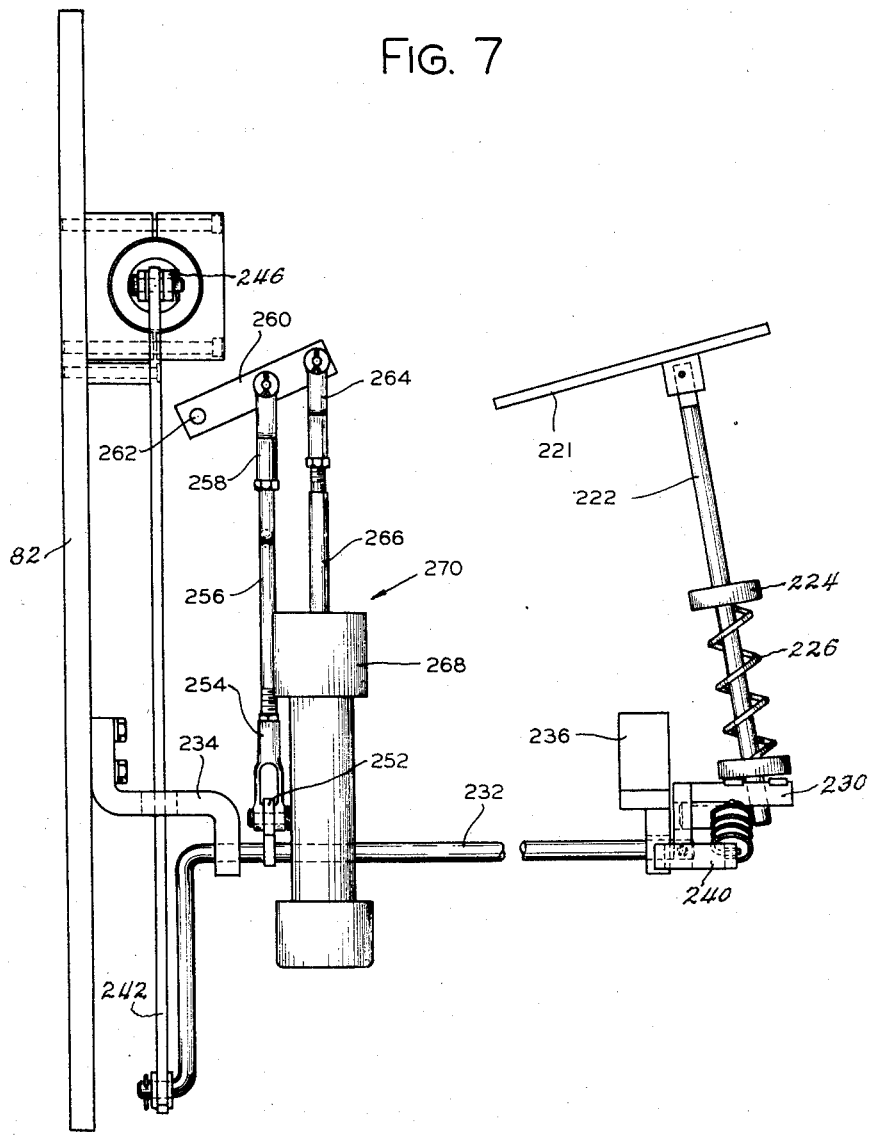
Figure 7 is a side elevational view of the vehicle acceleration control linkage of our control means.
Figure 8:
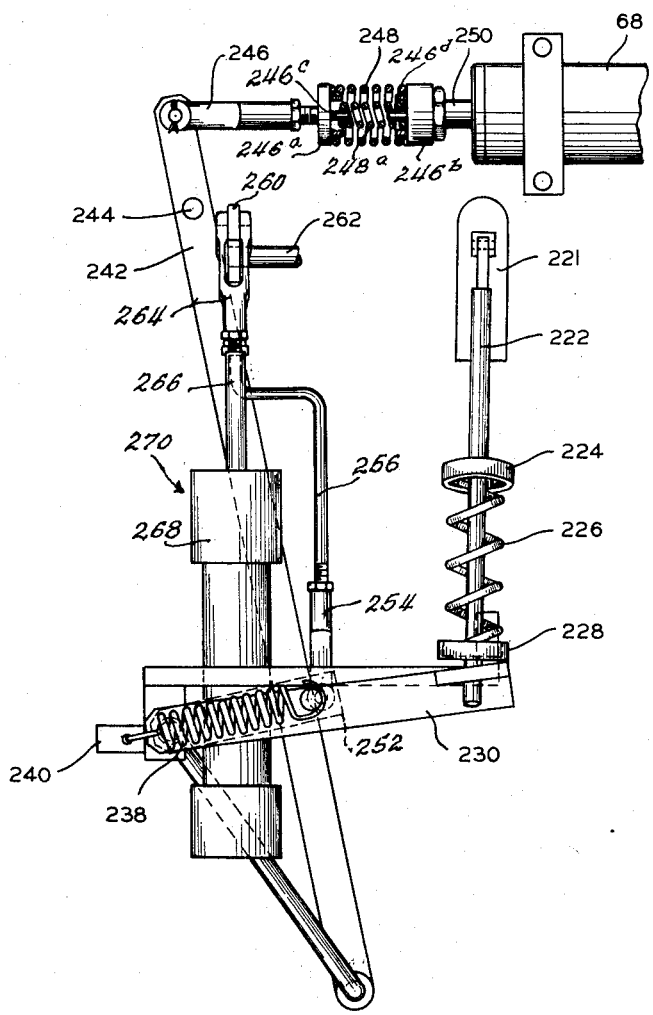
Figure 8 is a front elevational view of the linkage shown in Figure 7.

Turning now to speed control of the drive motor 30, we shall describe in connection with Figures 7 and 8 the linkage means that is arranged between the foot-operated accelerator pedal 221 and the carbon pile regulator 68 for varying the pressure applied to the carbon elements of the latter. A spring cap 224 is secured to the intermediate part of the rod 222 that pivotally supports the accelerator pedal 221. The spring cap 224 rests on the upper end of a coil spring 226 which is disposed concentrically about the rod 222 and is supported by a spring seat 228 slidable on the accelerator rod 222. The spring seat 228, in turn, is supported at the one end of a generally horizontal lever 230 extending at right angles from the one end of a horizontal shaft 232 which is journaled in brackets 234 and 236 suitably secured to the vehicle frame. The accelerator rod 222 extends through the lever 230, and when depressed exerts a downward force on the spring 226 for pivoting the lever 230 and shaft 232 clockwise from the position shown in Figure 8. So as to return and to maintain normally the lever 230 in the position shown when the rod 222 is released, a coil spring 238 is secured at one end to the lever 230 and at the other end to a fixed frame member 240.

The shaft 232 is bent downwardly at its left end, as viewed in Figure 7, and is formed with a horizontal end portion that is pivotally connected with the lower end of an upwardly extending lever 242. The lever 242 is pivotally mounted intermediate its ends on a horizontal fixed pin 244 and at its upper end is pivotally connected with a clevis member 246 to the inner end of which is attached a spring seat member 246a which receives the outer end of a compression coil spring 248. The inner end of the spring 248 seats in a cup or seat member 246b secured on the outer end of the pressure applying rod 250 of the regulator 68. A compression spring 248a, disposed within spring 248 fits at its ends about studs 246c and 246d extending from the spring seat members or cups 246a and 246b, respectively. The spring 248a is shorter than spring 248 and has substantially greater strength or rigidity than the latter. When the accelerator pedal 221 and rod 222 are depressed, the lever 230, the shaft 232 and the lever 242 are pivoted clockwise and the regulator rod 250 is urged to the right, as viewed in Figure 8, for compressing the carbon elements of the regulator 68 and thereby reducing the effective unit resistance thereof. During the initial clockwise movement of lever 242 the spring 248 is compressed slightly without materially reducing the resistance of regulator 68. If the clockwise movement of lever 242 is continued, spring 248a is placed under increasing compression with corresponding substantial increase in pressure exerted upon the carbon elements of the regulator 68 and resultant material reduction in the resistance of the latter. Release of the accelerator pedal 221 relieves the pressure applied to the carbon elements for increasing the effective unit resistance of the regulator. Consequently, movement of the accelerator pedal 221 serves to control the speed of the motor 30 by varying the resistance in the electrical circuit. The spring 248 insures that a minimum compressive force is always maintained on the carbon elements or discs of the regulator 68 for preventing arcing and mechanical abrasion between the elements.

To provide for smooth, uniform acceleration and deceleration of the motor 30, time delay mechanism (Figures 7 and 8) is associated with the acceleration control linkage means. The time delay mechanism comprises a lever 252 which at one end is secured to the shaft 232 and at the other end is pivoted to a clevis member 254 adjustably mounted at the lower end of an upwardly extending rod 256. The upper offset end portion of the rod 256 has adjustably mounted thereon a clevis member 258 that is pivotally connected to the intermediate portion of a lever 260. The lever 260 at one end is fixed on a horizontal shaft 262 journaled for limited rotary movement relative to the vehicle frame, and at the other end is pivoted to a clevis member 264 adjustably mounted on the upper end of a vertical piston rod or plunger 266 which carries a piston (not shown) slidably mounted in the cylinder 268 of an oil type dashpot unit 270.

When the accelerator pedal 221 is depressed and the lever 230 and shaft 232 are pivoted, the lever 260 is urged to pivot clockwise under the action of the interconnected lever 252 and rod 256. Clockwise pivotal movement of the lever 260 exerts a downward force on the piston rod 266. On the other hand, when the accelerator pedal 221 is released, the piston rod 266 is urged upwardly by the spring-biased interconnecting linkage means. Downward movement of the piston rod 266 is resisted by oil within the cylinder 268 of the dashpot unit 270 and the rate of movement is controlled by the rate at which the oil is able to bleed from one side of the dashpot piston to the other side. This bleeding of the oil is time controlled and consequently sudden downward movement of the piston rod 266 is prevented. Since the time delay action of the dashpot 270 prevents rapid downward movement of the piston rod 266, the linkage, including the pressure-applying rod 250 of the regulator 68, operatively associated therewith, cannot be actuated rapidly in a jolting manner. As a result the pressure applied to the carbon elements in the regulator 68 can only be increased uniformly and smoothly, thus preventing the delivery of rapid surges of current to the drive motor 30. Should the accelerator rod 222 be depressed more rapidly than the rate of downward movement of piston rod 266 permitted by the dashpot unit 270, the spring 226 is compressed and stores energy until the time delay mechanism permits the energy to be released for controlling the regulator 68. As will be clear from the above, the above described acceleration control means provides for uniform acceleration of the vehicle in infinite steps. This ideal speed control prevents jolting of the vehicle and loads carried thereby.

Figure 9:
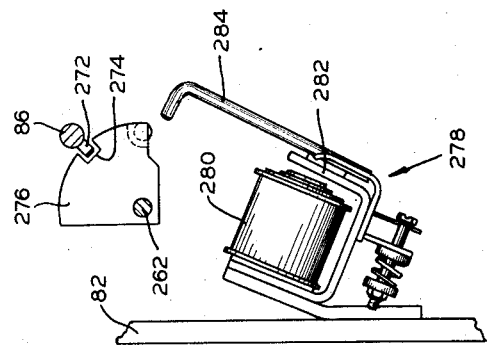
Figure 9 is a side elevational view of the mechanism which functions to limit surges of current to the electric drive motor.

In order to prevent both initial energization of the motor 30 and subsequent reversals in the direction of current flow to the latter when the motor circuit is conditioned for a high rate of current flow, the accelerator pedal 221 of our control means has an interlocking connection (Figure 9) with the shiftable directional switch control shaft 86, whereby the switch actuator 64 can be moved between its three positions only when the accelerator pedal 221 is completely released, and the regulator 68 is in a maximum resistance (minimum current flow) position. The control shaft 86 is provided with a pair of axially spaced depending bosses 272, one of which is shown in Figure 9, which cooperate with a blocker plate 276 having a notch 274 formed therein. The blocker plate 276 is secured to the shaft 262 which pivots with the lever 260, shown in Figure 7, as the regulator 68 is actuated.

If the switch actuator shaft 86 is in a neutral position and the accelerator pedal 221 is depressed for applying pressure to the carbon elements of the regulator 68 so as to condition the motor circuit for a high rate of current flow, the plate 276 is rotated clockwise from the position shown in Figure 9 and the body of the plate 276 is disposed in the path of movement of the bosses 272 which normally lie on either side of the plate. With the plate 276 in a blocking position movement of the shaft 86 and energization of the motor 30 are prevented. Now when the accelerator pedal 221 is released and only minimum pressure is applied to the carbon elements of the regulator 68, the blocker plate 276 returns to the position shown in Figure 9 for permitting passage of the bosses 272 through the notch 274. With the plate 276 in this position, the control shaft 86 may be shifted for initially moving the directional switch actuator 64 from a neutral to a forward or reverse drive position and for subsequently moving the actuator 64 from a forward to a reverse drive position, or vice versa. After the shaft 86 has been shifted for moving the switch actuator 64 to a forward or reverse drive position, the bosses 272 assume a position on one side or the other of the plate 276, depending on the selected direction of drive. Then, as the accelerator pedal 221 is depressed the body of the plate 276 is disposed again in the path of movement of the bosses 272. Thereafter, the shaft 86 cannot be returned to neutral or shifted to the opposite drive position for reversing the direction of current flow to the drive motor 30 until the accelerator pedal 221 is released and the plate 276 returned to a non-blocking position with the notch 274 aligned with the bosses 272. Consequently a change in the position of the actuator 64 can only be made when the accelerator pedal 221 is completely released and the regulator 68 is in a maximum resistance condition.

We further provide means for limiting the rate of current delivered to the motor 30, when the direction of current flow to the latter has been reversed, until the speed of the motor in the first selected direction of drive decreases to a predetermined value. The current flow controlling means comprises an anti-plugging relay assembly 278 that is secured, as shown in Figure 9, to the vehicle plate 82 immediately below the blocker plate 276. The relay assembly 278 includes a coil 280 which is energized by the back electromotive force developed by the motor 30 when the directional switch actuator 64 is returned from one drive position to an open neutral position prior to being disposed in the opposite drive position. Energization of the coil 280 attracts the armatures 282 and moves the blocker rod 284, which is secured to the armature 282, into a position where the upper end interferes with pivotal movement of the blocker plate 276. When pivotal movement of the blocker plate 276 is prevented, and after the switch actuator 64 has been disposed in the opposite drive position, pressure cannot be applied to the carbon elements of the regulator 68 and the resistance cannot be decreased for increasing the current in the motor circuit.

The coil 280 remains energized for holding the rod 284 in a position blocking rotary movement of the plate 276 until both the speed of the motor and the back electromotive force developed thereby decrease to predetermined values. When the coil 280 is de-energized the rod 284 swings away from the plate 276 and the latter is then free to rotate for permitting actuation of the regulator 68. Current delivered to the motor immediately upon a reverse in direction of drive is hence limited to a predetermined value, since movement of the regulator actuating rod 250 to the second selected direction of drive is prevented until the speed of the motor 30 in the first selected direction of drive is reduced to a predetermined value.

Figure 11:
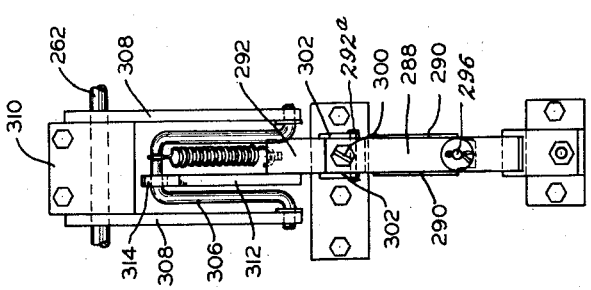
Figure 11 is a front elevational view of the switch means of Figure 10.
Figure 10:
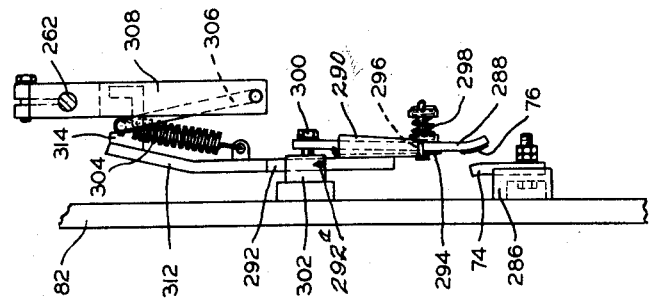
Figure 10 is a side elevational view of switch means which is employed for shorting out the speed rheostat in our control circuit.

As noted hereinbefore in connection with Figure 2, contacts 74 and 76 are provided for shorting out the regulator 68 when the carbon elements of the latter are fully compressed. We shall now describe the structure which effects opening and closing of these contacts. Referring to Figures 10 and 11, the contact 74 is stationarily supported by a bracket 286 secured to the vehicle plate member 82. The contact 76, on the other hand, is carried at the lower end of a generally vertical switch bar 288 which is guided for floating movement between the parallel side arms 290 of a channel member 294 secured on the lower end of a vertical switch arm 292 pivoted at 292a between parallel arms of a guide bracket 302 secured to plate 82. A horizontal pin 296 passes through channel member 294 and the switch bar 288, and the latter members are biased together by a coil spring 298 arranged concentrically about the pin 296 at one side of the switch bar 288. A cap screw 300, threaded in the upper end of switch bar 288 provides means for attachment thereto of a lead wire, and a forwardly projecting lip at the upper end of channel member 294 provides a fulcrum for rocking movement of switch bar 288.

The upper end of the switch arm 292 is connected to the lower end of a coil tension spring 304 which, at its upper end, is attached to the bight portion of an inverted U-shaped hanger member 306 that has horizontal end portions pivotally mounted in the lower ends of a pair of spaced levers 308. The levers 308, at their upper ends, are secured to the opposite sides of a block member 310 which is fixed to the shaft 262 that pivots with the lever 260, shown in Figure 7, as the speed regulator 68 is actuated. A strap member 312 is secured at its lower end to one side of the switch arm 292, and, carries at its upper end a U-shaped extension 314 which slidably receives the bight portion of the inverted U-shaped hanger 306.

The above described contact actuating structure provides for both snap closing and snap opening of the contacts 74 and 76. In operation, as pressure is applied to the carbon elements of the regulator 68, the levers 308 are pivoted clockwise from the position shown in Figure 10. During this pivoting of the levers 308 the member 306 is pivoted clockwise and the bight portion of the latter is elevated causing extension of the spring 304. The contact actuating structure is so adjusted that approximately at the point when the carbon elements of the regulator 68 are completely compressed the plane of the member 306 is passed from one side of the axis of the spring 304 to the other side. This over-center movement causes the bight portion of the member 306 to snap from the left end of the member 314 to the right end thereof. As this occurs, the strap 312, arm 292, and bar 288 are pivoted clockwise for snapping the contact 76 into engagement with the contact 74 whereupon the regulator 68 is shorted out of the motor circuit. It will be understood that the contact 76 yieldably engages the contact 74 because of the provision of the coil spring 298.

Conversely, when the speed of the drive motor is to be decreased and pressure is relieved on the elements of the regulator 68, the levers 308 pivot counterclockwise back toward the position shown in Figure 10. This return movement of the levers 308 causes the plane of the member 306 to pass through the axis of the spring 304, and the bight portion of the member 306 to snap from the right end of the member 314 to the left end. Simultaneously the strap 312, arm 292 and bar 288 are pivoted counterclockwise for abruptly disengaging the contact 76 from the contact 74 whereupon the regulator is again permitted to function in the motor circuit.

In the modification shown in Figures 12, 12A and 13 rod 256 is pivoted at its lower end to the forward end of arm 320 of a bell crank 321 pivoted at 322. The other arm 323 of bell crank 321 is pivoted, at its lower end, at 325, to the rearward end of an adjustable link 326 pivoted at its forward end, at 327, to the lower end of downwardly extending arm 328 of bell crank 329 pivoted at 330. The other arm 331 of bell crank 329 normally extends upwardly and forwardly and slidably receives the accelerator pedal rod yieldingly urged upward by a compression spring as previously described. The bell crank 329 is yieldingly urged in counterclockwise direction about its pivot 330 by suitable means (not shown) effective for returning it to its normal position when pressure upon the accelerator pedal is released, as will be understood from the preceding description.

When the accelerator pedal is in its normal raised position, blocker plate 276a secured on shaft 262 is so disposed that element 274a thereof can pass freely through notch 272b in an annular boss or abutment member 272a secured on the shiftable switch control shaft or rod 86. The plate 276 is so positioned, lengthwise of shaft 262, that abutment member 272a is disposed at one side of plate 276a, in close proximity thereto, in one direction of drive and is disposed at the other side of plate 276a in the opposite direction of drive. Depressing the accelerator pedal and resultant turning of bell crank 329 in clockwise direction, turns shaft 262 clockwise and moves blocker plate 276a into block position in the path of abutment member 272a, effective for preventing shifting of rod 86 from one directional drive position to the opposite directional drive position. Accordingly, in order either to reverse the direction of drive, or to shift rod 86 to either drive position, the accelerator pedal must first be returned to its normal raised position and the blocker plate 276a must be returned to its normal position clear of the path of movement of abutment member 272a. That effectively guards against either starting of motor 30 or reversal of drive when the motor circuit is conditioned for a high rate of current flow, as will be explained presently.

In Figure 13 the carbon pile regulator 68 is mounted beneath the truck, above a protective plate 335 of sheet metal or other suitable material. Clevis 246a is connected at one end to the pressure applying rod 250 of the regulator 68 by spring means such as previously described. The other end of clevis 246a is pivoted, at 336, to a lever 337 pivoted at its inner end, at 338, on a bracket 339 mounted on a lengthwise frame member 340 of the truck. The pivot point of lever 337 is disposed to one side of clevis 246a beyond the other side of which lever 337 extends for a substantial distance in approximate parallelism with a cross member 341 of the truck frame and through an elongated slotted guide and support bracket 342 suitably mounted on the truck body. The outer end of lever 337 is pivoted, at 343, to the rearward end of an adjustable link 344 pivoted at its forward end to the lower end of arm 328 of bell crank 329 on the same pivot 327 as the forward end of link 326.

When the bell crank 329 is turned clockwise, as viewed in Figure 12, incident to depression of the accelerator pedal, lever 337 will be moved in clockwise direction about its pivot 338 effective for applying pressure to the carbon pile regulator 68 and thereby increasing current flow to drive motor 30, as previously described. Upon release of pressure upon the accelerator pedal the latter is returned to its normal raised position and lever 337 is turned counterclockwise to its normal position in which minimum pressure is exerted upon the carbon pile regulator 63 with resultant minimum flow of current to motor 30. The rate of turning of bell crank 329 clockwise is controlled by the dash-pot 270 as and for the purposes previously stated. Movement of lever 337 is dependent upon movement of bell crank 329. Accordingly, the blocker plate 276a and abutment member 272a and associated parts effectively prevent either starting of motor 30, or reversal of drive, when the carbon pile regulator 68 is under substantial pressure conditioning the motor circuit for a high rate of current flow, with the advantages previously noted.

Referring further to Figures 12 and 12A, rod 284a of the anti-plugging relay assembly 278 has a fork 345 secured on its upper end and extending toward shaft 262. Each arm of fork 345 is provided with an elongated slot 346 which receives one end portion of a pivot pin 347 passing through the overlapping end of upper and lower toggle links 348 and 349, respectively. The upper end of upper link 348 is pivoted, at 350, to the lower forward corner of blocker plate 276a, and the lower end of link 349 is pivoted, at 351, on bracket 352 mounted on plate 82. The lower link 349 carries an adjustable abutment member, conveniently a screw 353 disposed to contact bracket 352 when armature 282 is attracted by coil 280 so as to lock the toggle links in aligned extended positions, as shown in Figure 12A.

Upon shifting of switch actuator 64 to reverse motor 30, coil 280 is energized by the back electromotive force from motor 30 and rod 284a is swung counterclockwise, effective for straightening the toggle comprising the links 348 and 349 thereby locking blocker plate 276a in its neutral position. That locks lever 260 and its associated linkage against movement thereby preventing movement of lever 337 in a direction to apply increased pressure to the carbon pile regulator 68. At that time the contacts 74 and 76 are open. When the motor speed and the back electromotive force have dropped to a desired predetermined value, coil 280 releases armature 282 and rod 284a is snapped away from shaft 262. As rod 284a approaches the end of its travel fork 345, the inner ends of slot 346 strikes the pivot pin 347 and forces the latter outward, thus breaking the toggle linkage. The shaft 262 may then be turned as and for the purposes above described.

Figure 14:
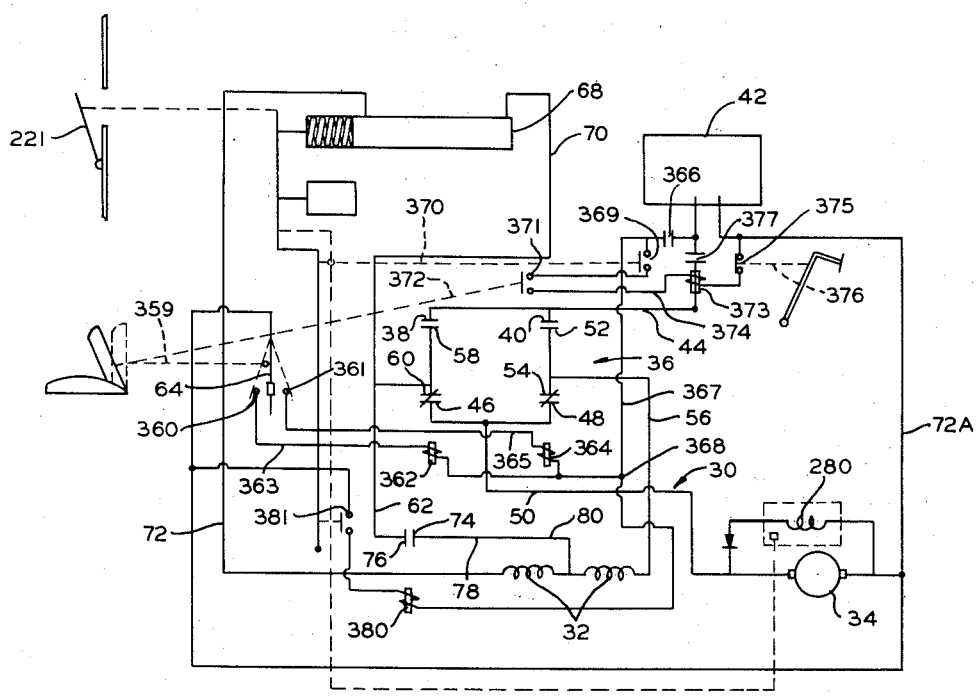
Figure 14 is a diagrammatic view, similar to Figure 2, of a modified control means for our present invention.

In Figure 14, we have set forth a schematic plan for a modified control system, similar to that of Figure 2, but in which electrical means replace many of the mechanical means first described for energizing the control circuit for the motor 30.

As previously described, the motor 30 comprises field windings 32 and an armature 34. The components of the drive motor circuit are controlled by a directional switch unit indicated generally by numeral 36 which includes a first pair of contacts 38 and 40 connected to battery 42 by conductor 44 as in Figure 2. A second set of contacts 46 and 48 are connected to one side of armature 34 by conductor 50 and a third set of contacts 52 and 54 are connected to one side of the field windings 32 by conductor 56. A fourth pair of contacts 58 and 60 are connected to the center point of the field windings 32 by conductor 80 and such sets of contacts for the control switch unit 36 are physically arranged as previously described and illustrated in Figure 3; such switch unit being operated by manual actuator 64 pivotally mounted intermediate its ends for movement about a horizontal axis. The motor circuit further includes a carbon pile regulator or rheostat 68 as previously described, one side of which is connected to contacts 58 and 60 by conductor 70 while the other side thereof is connected to the motor field windings 32 by means of conductor 72.

As previously related, direction of the motor rotation is selected by moving actuator 64 either clockwise or counterclockwise from a vertical neutral position, as shown in Figure 14, thereby causing electrical energization of operating circuits as will now be set forth.

Operation of the direction selection lever 64 is accomplished manually and a mechanical interlock between the seat and such lever is demonstrated by dotted line 359 to return such direction selector lever 64 to its neutral position between contacts 360 and 361 whenever the operator is absent from the seat. When lever 64 is moved clockwise from its neutral position as shown in Figure 14, the same closes or engages contacts 360 to permit energization of a solenoid 362 in circuit therewith through conductor 363. Energization of solenoid 362 causes the closing of contacts 38 and 58 and the opening of contacts 46 and 60.

When contact 361 is engaged by the direction selector lever 64 a second solenoid 364 electrically coupled to contact 361 by conductor 365, is energized to cause contacts 40 and 52 to close and contacts 48 and 54 to open. When solenoid 362 is energized, the flow of current through field 32 is in one direction and when solenoid 364 is energized, the direction of current flow through the field windings 32 is reversed. Reversal of the direction of current flow in field windings 32, with respect to the direction of the flow of current in the motor armature 34 causes a reversal of motor rotation.

In addition to the circuitry of Figure 2, the arrangement of Figure 14 includes certain additional electrical interlocks and contactors for safety of operation.

To energize the circuit containing solenoid 362 and contact 360, for example, it is first necessary to operate a set of contacts 366 which close in response to operation of the ignition key, thereby permitting current to flow from battery 42 through conductor 367 to conductor 363 at their junction 368. If the selector lever 64 is in closed engagement with contact 360, current will flow through conductor 363 and solenoid 362, contacts 360, conductor 72A and back to the negative side of the supply line or battery.

As mentioned before, energization of solenoid 362 causes the contacts 38 and 58 to close and contacts 46 and 60 to open. Contacts 54 and 48 are likewise closed in this condition. If now, the accelerator pedal 221 is slightly depressed, a set of interlock contacts 369 will be closed by virtue of mechanical interlinkage 370. If the operator is in the seat, then a second set of interlock contacts 371 also will be closed by means of an interlock linkage 372 joined to the operator's seat. This condition permits energization of solenoid coil 373 in circuit with contacts 369 and 371 and coupled by means of conductor 374 provided a third set of interlock contacts 375 associated with the brake lever and interlock linkage 376 are closed. If the brake is released, such interlock contacts 375 will be closed as illustrated in Figure 14 thereby permitting energization of solenoid 373. Energization of solenoid 373 causes closure of mainline contactors 377 permitting energy to flow from battery 42 via conductor 44 to the closed set of contacts 38 and 58. Since contacts 46 and 60 are open, the current then flows to the field windings 32 via conductor 70, the rheostat 68 and thence through the closed contacts 54 and 48, conductor 50, armature 34 and the negative line conductor 72A.

If, on the other hand, the direction selector lever 64 is engaged with contact 361, and the conditions for closing interlock contacts 366, 369, 371, 375 and 377 are met as above described, then current will energize solenoid 364 and close contacts 40—52 via conductors 367, 365, contacts 361 and return conductor 72A. Current will also flow then via conductor 44 to closed contacts 40—52, through conductor 56 to field windings 32, conductor 72, rheostat or regulator 68, conductor 70, through closed contacts 46 and 60, conductor 50 to the armature 34 and thence back to the negative side of the line by conductor 72A.

As before, speed of motor 30 is controlled in both forward and reverse drive by changing the pressure applied to the carbon elements or regulator 68, thus varying the resistance offered by the latter to the flow of current in the motor circuit. Such variation in the regulation of the resistance offered by regulator 68 is in response to manipulation of the foot operated accelerator pedal 221.

Associated with the regulator 68 is a set of normally opened contacts 74, 76 operable in the alternate circuit of Figure 14 in response to energization of a solenoid 380. When the carbon elements of the regulator 68 are compressed to a predetermined extent, substantially full extent, a linkage means associated with the accelerator pedal 221 causes the closing of interlock contacts 381 thus permitting energization of solenoid 380 and closing contacts 74, 76. Such closure of contacts 74 and 76 causes the high speed section of the motor field windings 32 to short out; the starting resistor or regulator 68 thereby allowing the motor to run at its highest speed.

From the foregoing, it will be realized that we have illustrated and described a modified arrangement for regulating the speed and operation of a motor 30 in which certain electrical interlocks have been provided so that the energization of the control circuit takes place largely through the operation of electrical means as opposed to the mechanical operating means first described in Figure 2. Of special impact in this modified arrangement is the provision of the various interlocks such as key operated contacts 366, the accelerator pedal interlock contacts 369, the seat operator interlock contacts 371 and the brake operated interlock contacts 375. Further, the provision of the high speed cut out circuit including the solenoid 380 and contacts 381 provides a further distinction between the circuit of Figure 14 and that of Figure 2.

It will be recognized, of course, that depressing of the brake pedal separates interlock contacts 375, de-energizing solenoid 373 and opening line contactors 377 thereby de-energizing the motor. Likewise opening of contacts 369 by releasing pressure on the accelerator pedal 221 or opening of contacts 371 by the operator leaving the seat will de-energize the solenoid 373 and the motor 30.

From the above description of our invention, it will be noted that we have provided control means for the electric drive motor of a vehicle wherein the direction of drive may be conveniently selected manually by an operator seated on the vehicle. To prevent unattended operation of the vehicle, our control means permits operation of the electric drive motor only when an operator is seated on the vehicle. To facilitate accurate positioning of the vehicle, the drive motor is interrelated with the vehicle brakes. To provide for uniform, smooth acceleration of the drive motor in infinite steps, we employ, in our control system, a carbon pile regulator wherein the speed with which pressure may be applied for varying the resistance of the regulator is time controlled. And finally, to prevent an immediate flow of current at a high rate to the motor when the direction of current flow to the latter is reversed, we provide means for allowing a change in direction of drive of the motor only when the speed regulator is in a maximum resistance position and current at a low rate is flowing in the motor circuit.

Now while we have shown and described what we believe to be a preferred embodiment of our present invention, it will be understood that various rearrangements and modifications may be made therein without departing from the spirit and scope of our invention.

We claim:

1. In control means for a vehicle having an electric drive motor, carbon pile regulator means for steplessly adjusting the rotational speed of the motor, means operating said regulator means to vary the current applied to said motor from minimum to maximum, direction selector switch means controlling the circuit of said motor and its rotational direction, and anti-plug relay means energized by back electromotive force developed by the motor at direction changing operation of said switch means for limiting the magnitude of reverse direction current which may be applied to the motor until predetermined values of motor speed and said back electromotive force intermediate the maximum and minimum values therefor are developed.

2. In control means for a vehicle having an electric drive motor, a directional switch with an actuator disposable in a neutral forward or reverse drive position for controlling the direction of drive of the electric motor as selected, and brake actuating means for the vehicle, the combination comprising, manually operable linkage means including yieldable means for moving the switch actuator from a neutral to a forward or reverse drive position, and interlock means operated by the vehicle brake actuating means for returning the switch actuator to a neutral position when the vehicle's brakes are applied regardless of its forward or reverse drive position as selected by said linkage means whereby, at the release of the vehicle's brakes, the switch actuator is automatically returned by said yieldable means to the forward or reverse drive position previously selected by said linkage means.

3. In control means for a vehicle having an electric drive motor, variable resistance regulator means, accelerator control means for operating said regulator means to steplessly vary the rotational speed of the motor, antiplug relay means energized by predetermined values of a back electromotive force developed in the motor, and means operated by said anti-plug relay means to prevent operation of said control means to accelerate the motor until predetermined intermediate values of motor speed and back electromotive force are attained.

4. In control means for a vehicle having an electric drive motor, a variable resistance regulator, acceleration control linkage means including means having an abutment surface for operating said regulator to steplessly vary the speed of the motor, anti-plug relay means energized by predetermined values of back electromotive force developed in the motor, and linkage means operated by said anti-plug relay means to interferingly engage said abutment surface to prevent operation of said control linkage for accelerating said motor until predetermined motor speeds are developed.

5. The combination as set forth in claim 4 in which said anti-plug relay means releases said acceleration control linkage means at motor speeds intermediate the maximum and minimum operating speeds therefor, and a direction selector switch for controlling rotational direction of the motor, the said back electromotive force for energizing said relay means being developed at operation of said switch to reverse the motor's direction of rotation.

6. In control means for a vehicle having an electric drive motor, variable resistance regulator means, accelerator control means for operating said regulator means to steplessly change the rotational speed of the motor, electro magnetic anti-plug relay means associated with said motor and interlock means operated by said anti-plug relay means for preventing the operation of said control means for acceleration of the motor until predetermined values of motor speed are attained.

7. In control means for a vehicle having an electric drive motor, a variable resistance regulator, acceleration control linkage means including an abutment surface for operating said regulator to steplessly adjust the rotational speed of the motor, electro magnetic anti-plug relay means associated with the motor, and linkage means operated by said anti-plug relay means to interferingly engage said abutment surface and prevent operation of said control linkage in a manner appropriate to accelerate said motor until predetermined motor speeds are developed.

8. In control means for a vehicle having an electric drive motor, a directional switch with an actuator disposable in a neutral, forward or reverse drive position for controlling the direction of drive of the electric motor, an operator's seat on the vehicle, and brake actuating means for the vehicle, the combination of manually operable linkage means having yieldable means for moving the switch actuator from a neutral to a forward or reverse drive position, first interlock means associated with the operator's seat and said linkage means for returning the switch actuator to a neutral position when the operator's weight is removed from the seat, and second interlock means controlled by the vehicle brake actuating means for returning the switch actuator automatically to a neutral position when the vehicle brakes are applied while said manually operable linkage means yields and remains as previously conditioned so that when the vehicle brakes are released the switch actuator is automatically returned to its previously selected forward or reverse drive position by operation of said yieldable means.

9. In control means for a vehicle having an electric drive motor, a directional switch with an actuator disposable in a neutral, forward or reverse drive position for controlling the direction of drive of the electric motor, an operator's seat on the vehicle, and brake actuating means for the vehicle, the combination of means for selectively moving the switch actuator from a neutral to a forward or reverse drive position including yieldable means, means associated with the operator's seat and said first-named means for returning the switch actuator automatically to a neutral position when the vehicle operator's weight is removed from the seat, additional means independently controlled by the vehicle brake actuating means for returning the switch actuator automatically to a neutral position when the vehicle brakes are applied without disturbing the switch actuating condition of said first named means, a carbon pile regulator for steplessly controlling the speed of the electric motor, means for actuating said regulator to vary the speed of the electric motor, time delay means associated with said regulator actuating means for limiting the rate at which said regulator may be actuated in order to provide for smooth acceleration and deceleration fo the electric motor, and means associated with said regulator actuating means for preventing movement of the switch actuator between its several positions except when said regulator is in a minimum speed condition.

10. In control means for a vehicle having an electric drive motor, a directional switch with a contact carrying actuator pivotal to a neutral, forward or reverse drive position for controlling the direction of drive of the electric motor, an operator's seat on the vehicle and brake actuating means for the vehicle, the combination of manually operable linkage including resilient means yieldably engageable with one end of the switch actuator for pivoting the latter from a neutral to a forward or reverse drive position, linkage means operatively associated with the operator's seat and said manually operable linkage means for returning the switch actuator to a neutral position when the vehicle operator's weight is removed from the seat, and additional linkage controlled by the vehicle brake actuating means and engageable with the other end of the switch actuator for pivoting the latter from a forward or reverse to a neutral position against the biasing force of said resilient means when the vehicle brakes are applied; the directional positioning of said manually operable linkage means remaining as previously selected so that when the vehicle brakes are released said switch actuator is automatically returned to its previously selected forward or reverse drive position by said resilient means.

11. In control means for a vehicle having an electric drive motor and a directional switch with an actuator disposable in a neutral, forward or reverse drive position for controlling the direction of drive of the electric motor, the combination of a regulator having a plurality of adjacent movable carbon elements compressible for controlling the speed of the electric motor, foot operated acceleration control means, linkage means having connection with said foot operated acceleration control means and said regulator whereby the former is operable progressively to apply pressure to the carbon elements of said regulator to decrease the resistance thereof and increase the speed of the electric motor, manually operable linkage means for selectively moving the switch actuator from a neutral to a forward or reverse drive position including a rectilinear movable shaft provided with spaced abutment members, and a blocker plate pivoted by said acceleration control linkage means adjacent said shaft to block movement of said abutment members therepast for preventing movement of the switch actuator between its several positions except when said accelerator control means is positioned for minimum motor speed.

12. In control means for a vehicle having an electric drive motor, a directional switch with an actuator pivotal to a neutral, forward or reverse drive position for controlling the direction of drive of the electric motor, an operator's seat on the vehicle, and brake actuating means for the vehicle, the combination of a regulator having a plurality of adjacent movable carbon elements for controlling the speed of the electric motor, foot operated acceleration control means, linkage means having connection with said foot operated acceleration control means and said regulator whereby the former is operable progressively to apply pressure to the carbon elements of said regulator to decrease the resistance thereof and to increase the speed of the electric motor, said acceleration control linkage means including means for maintaining a minimum pressure on the carbon elements of said regulator so as to prevent arcing and mechanical abrasion between the elements, switch means for shorting out said regulator, said switch means being closed by said acceleration control linkage means when the carbon elements of said regulator are compressed to a predetermined resistance position, time delay means including dashpot means associated with said acceleration control linkage means for limiting the rate of compressing said carbon elements independently of the rate with which said accelerator control linkage means may be actuated in order to provide for smooth acceleration of the electric motor, manually operable linkage means including resilient means yieldably engageable with one end of the switch actuator for pivoting the latter from a neutral to a forward or reverse drive position, additional linkage means operatively associated with the operator's seat and said switch actuator linkage means for operating the latter and returning the switch actuator to a neutral position when the vehicle operator's weight is removed from the seat, plunger means controlled by the vehicle brake actuating means and engageable with the other end of the switch actuator for pivoting the latter to a neutral position when the vehicle brakes are applied said plunger means overcoming the bias of said resilient means without changing the operating position of said switch actuator linkage means so that when the vehicle brakes are released said resilient means serves to return the switch actuator to a forward or reverse drive position as previously selected by its said actuator linkage means, a blocker plate pivoted by said acceleration control linkage means to a position preventing operation of said switch actuator linkage means except when said accelerator control means is positioned for minimum motor speed, and relay means for limiting the magnitude of reverse direction current applied to the electric motor until predetermined motor speeds are developed.

13. In control means for a vehicle having an electric motor, a directional switch with an actuator disposable in a neutral, forward or reverse drive position for controlling the direction of drive of the electric motor, an operator's seat on the vehicle, and brake actuating means for the vehicle, the combination of, manually operable first linkage means for selectively moving the switch actuator from a neutral to a forward or reverse drive position, second linkage means operatively associated with the operator's seat and said first linkage means for returning the switch actuator to a neutral position when the vehicle operator's weight is removed from the seat, first and second electrical solenoid means for closing selected contacts of the directional switch in response to selective movement of the said switch actuator, and third solenoid means controlled by the vehicle brake actuating means for de-energizing one of said first and second solenoid means when the vehicle's brakes are applied.

14. In control means for a vehicle having an electric drive motor, a directional switch with an actuator disposable in a neutral, forward or reverse drive position for selectively controlling the direction of drive of the electric motor, an operator's seat on the vehicle, and brake actuating means for the vehicle, the combination of manually operable means for selectively moving the switch actuator from a neutral to a forward or reverse drive position, linkage means operatively associated with the operator's seat and said last named means for returning the switch actuator to a neutral position when the vehicle operator's weight is removed from the seat, a pair of solenoid means each for selectively energizing the directional switch in response to operation of said actuator to forward and reverse drive positions, respectively, first interlock contact means associated with the operator's seat for de-energizing the motor and one of said solenoid members as selected by the switch actuator in response to the removal of the operator's weight from the vehicle's seat, and second interlock contact means associated with the vehicle's brake operating means for de-energizing one of the said solenoid members as selected by the switch actuator when the vehicle's brakes are applied.

15. In a control means for a vehicle having an electric drive motor, a directional switch with an actuator disposable in a neutral, forward or reverse drive position for controlling the direction of drive of the electric motor, an operator's seat on the vehicle, a brake actuating means for the vehicle, and an accelerator pedal for controlling the speed of rotation of the motor, the combination comprising, a rheostat means in circuit with the motor and operable in response to the manipulation of the accelerator pedal, a manually operable control lever mounted for selectively moving the switch actuator from a neutral to a forward or reverse drive position, linkage means including a first set of interlock contacts associated with the vehicle's seat for deenergizing the motor and returning the switch actuator to a neutral position when the vehicle operator's weight is removed from the seat, a second set of interlock contacts, linkage means associated with the accelerator pedal for opening said second set of said interlock contacts when said accelerator pedal is returned to a non-operative position, a third set of interlock contacts, linkage means controlled by the vehicle's brake actuating means for opening said third set of interlock contacts when the vehicle's brakes are applied, and a main supply line circuit breaker operable by solenoid means, the arrangement of said first, second and third set of interlock contacts being such as to control the circuit supplying the main line circuit breaker solenoid so that when any one of said interlock contacts are opened such main line circuit breaker is likewise opened to de-energize the motor.

References Cited in the file of this patent

UNITED STATES PATENTS

| | | |
|---|---|---|
| 650,609 | Otis | May 29, 1900 |
| 653,879 | Phelps | July 17, 1900 |
| 1,089,081 | Ray | Mar. 3, 1914 |
| 1,092,952 | Ray | Apr. 14, 1914 |
| 1,182,230 | Turbayne | May 9, 1916 |
| 1,277,188 | Bulley | Aug. 27, 1918 |
| 1,343,905 | Creveling | June 22, 1920 |
| 1,497,475 | Batty | June 10, 1924 |
| 1,556,586 | Carr | Oct. 13, 1925 |
| 1,828,272 | Ashbaugh et al. | Oct. 20, 1931 |
| 2,267,381 | Ulinski | Dec. 23, 1941 |
| 2,494,611 | Elwood | Jan. 17, 1950 |